3,152,747
EGG CARTON
Robert Lorne Cummings, Montreal, Quebec, Canada, assignor to Dominion Containers Limited, Montreal, Quebec, Canada
Filed Aug. 16, 1962, Ser. No. 217,463
3 Claims. (Cl. 229—28)

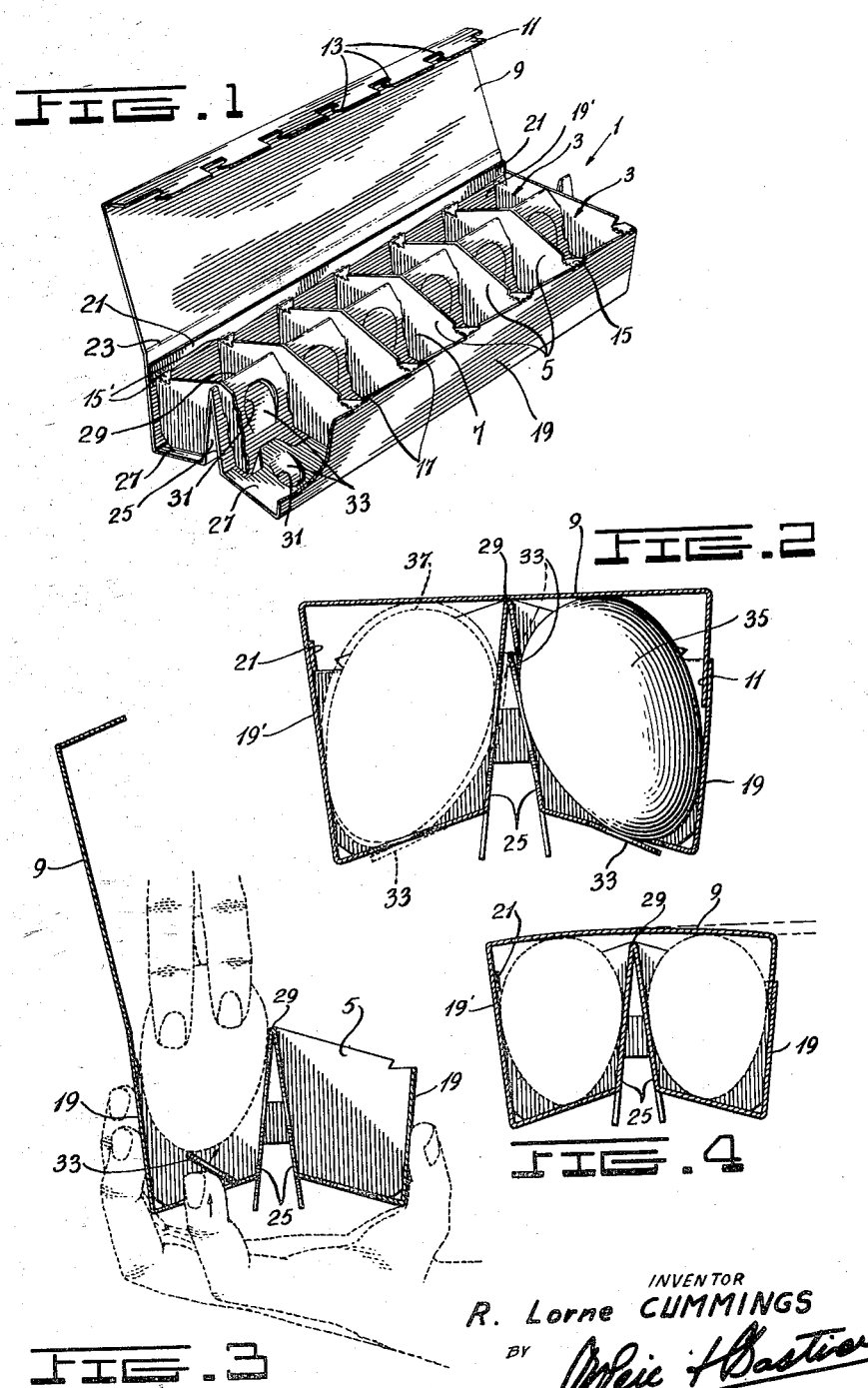

This invention relates to improvements in cellular egg cartons of the type illustrated and described in U.S. Patent No. 2,946,497 of July 26, 1960.

When an egg carton, such as that disclosed in the above mentioned U.S. patent is used, it must be made of two different sizes in order to accommodate small, medium and large size eggs on the one hand and extra large eggs on the other hand. It can be seen that it would be of considerable interest and saving in the industry if only one cardboard carton could be used for all sizes of eggs. If a carton for large and extra large eggs was used for packing small and medium eggs, the latter would be so loose in the carton as to dangerously move about. On the other hand, if the smaller sizes of carton were used to receive the larger eggs, the latter would be so tight in the compartments as to easily break at the least blow or handling or in stacking the cartons.

It is therefore a main object of the invention to provide egg cartons that will be usable for eggs of all sizes, yet having compartments so made that never will eggs be either too loose therein or squeezed in too tight that they may, in either cases, easily break in handling or stacking the cartons.

A further object of the invention consists in providing a compartmented carton for eggs wherein some of the walls of each compartment will have sufficient flexibility to easily yield to the larger sizes of eggs thus making it possible for eggs of smaller sizes to easily fit therein, yet not too loosely.

A still further object of the invention resides in the provision of an egg carton having means thereon for the easy removal of all eggs even those that may fit a little more tightly in the compartments.

The principle of the invention whereby the above objects are made possible resides in the fact that the bottom wall and also, preferably, the inner lateral wall are provided with yielding portions so that by placing an egg in a compartment with the pointed end downward, as is usual, the egg will tend to tilt laterally so that the long axis thereof will be inclined downwardly outwardly due to these yielding parts and also due to the fact that the cartons above referred to in the U.S. patent have an outwardly slanting bottom wall. Considerable space saving may thus be effected.

By having the inner lateral walls of transversely adjacent compartments yieldable and also having the bottom wall yieldable, it becomes possible to house the larger eggs relatively tightly, although capable of a certain amount of play on account of the flexibility of the above mentioned walls while it will snugly or slightly loosely accept eggs of smaller sizes.

Another feature that may be obtained with an egg carton as contemplated by the invention resides in the fact that the box cover or lid will find support on the ridge made by the top of adjoining inner lateral walls of the transversely adjacent compartments. Also, by having the eggs slanting outwardly and downwardly, they will not press the tongue of the cover against the outward wall thus making it possible to more easily open up the package, as will be seen hereinafter.

Further objects and other advantages of the invention will become apparent as the following description proceeds having regard to the annexed drawings wherein:

FIG. 1 is a longitudinal perspective view of a carton made according to the invention, the lid being open and part of a front compartment broken away to show the internal structure;

FIG. 2 is a view in cross-sectional elevation showing the carton of the invention in closed position with an egg shown in position in each of two transversely adjacent compartments;

FIG. 3 illustrates, in cross-sectional elevation, a carton according to the invention in open position with an egg being withdrawn therefrom;

FIG. 4 is an illustration, in cross-section, of an egg carton made according to U.S. Patent No. 2,946,497 to illustrate the improvements of the instant invention.

As can be seen from FIG. 1, the elongated carboard egg carton 1 made according to the invention comprises a cardboard blank folded to define two adjacent channels 3 which are, thereafter, provided with a series of transverse partitions 5 in known manner and more particularly as described in U.S. Patent No. 2,946,479. The partitions define a plurality of pairs of compartments 7 disposed longitudinally in succession with the compartment of a pair arranged transversely adjacent to one another. The blank 1 also defines a substantially flat cover 9 having, at the free end, a downwardly projecting locking tongue or flap 11 provided with suitable hook-like formations 13 engageable beneath triangular gussets 15 cut off from partitions 5 and folded horizontally on one side to come under a series of teeth 17 formed along the top edge of one outer lateral wall 19 while the gussets 15' on the other outer lateral wall 19' are held in horizontal position by means of a retaining strip 21 glued or otherwise fixed at the top of the outer lateral wall 19' just below the fold line 23 of cover 9.

Blank 1 is also folded to form the inner compartment lateral walls 25 and the compartment bottom walls 27.

It will be noted from FIGS. 2, 3 and 4 particularly, that the bottom walls 27 are slanted downwardly and outwardly in accordance with the teaching of U.S. Patent No. 2,946,497 and that when cover 9 is closed, the locking flap 11 lies inwardly of the outerlateral wall 19. Also, the outer walls 19 and 19' converge downwardly toward one another while the inner walls 25 diverge downwardly away from one another from the top thereof which forms the ridge 29.

The novelty of the invention consists in providing an arcuate slot generally in the form of a U or a horseshoe slot 31 in each of the compartments 7 and through the bottom wall 27 thereof. It is also preferred to cut such a slot 31 through the inner lateral wall 25 of each compartment. The slits 31 will thus form flexible tabs 33 adapted to flex outwardly when eggs of the larger sizes are inserted in the compartments. It should be noted that, preferably, the cuts 31 are made so that the hinged line of the flexible tabs 33 lie toward the meeting line of the bottom wall and inner wall.

Thus, as clearly illustrated in FIG. 2, whenever an oversized egg 35 is inserted in one of the compartments, the flexible tab 33 and the slanting action of the bottom wall will tend to tilt it sideways so that its long axis points toward the meeting line between the bottom wall 27 and the outer lateral wall 19. In this position, it will be noted that cover 9 may still be made to sit flatly on the ridge 29 thus avoiding breakage whenever cartons are stacked. It will also leave tongue 11 of cover 9 free to sit against the outer lateral wall 19 so that it can easily be released whenever it is necessary to open the carton. On the left hand side of FIG. 2 is shown an egg 37 of a smaller size illustrating that it is still held snugly in the compartment due to the outer wall 19' and the resiliency of the inner wall 25.

FIG. 4 is intended to illustrate what would happen if eggs of the larger size were used with the small size of carton. In such a case, because of the non-resiliency of the lateral walls, the eggs tend to stay upright and lift the cover dangerously thus, if the cartons are stacked, the tendency would be for cover 9 to be pressed downwardly toward ridge 29, consequently breaking the eggs. Another inconvenience is that the lateral wall of the eggs press the tongue 11 of cover 9 against the outer lateral wall 19 making it more difficult to open the carton.

FIG. 3 is intended to illustrate how a flap 33 may be used in removing an egg from such a box. It is believed that this figure is self explanatory.

Although a preferred embodiment of the invention has just been described, it will be understood that many modifications may be made thereto without departing from the spirit of the invention, the scope of which is defined in the appended claims.

I claim:

1. A cardboard egg carton having a plurality of compartments, each comprising:
   (a) an outer and an inner upright side wall tapering downwardly toward one another;
   (b) a bottom wall extending between said side walls and sloping upwardly from the outer to join with the inner side wall, and
   (c) a resilient tab formed by an inverted U-shaped slot through said inner wall, said tab hinging adjacent said joining whereby said tab will allow the egg a tendency to tilt such that its longitudinal axis points in the general direction of the corner formed by the outer side wall and said bottom wall, and
   (d) a generally U-shaped slot cut through said bottom wall to form a further resilient tab hinging adjacent said joining to enhance any tendency of the egg to assume its tilted position.

2. An elongated cardboard egg carton having a plurality of compartments arranged in pairs disposed longitudinally in succession along the centerline of said carton with the compartments of a pair arranged adjacent one another transversely of said centerline, each pair of compartments comprising:
   (a) two upright downwardly converging outer walls and two upright downwardly diverging inner walls joined at the tops thereof;
   (b) two bottom walls each extending from an outer wall to join its adjacent inner wall and thus form two separate compartments;
   (c) said bottom walls sloping downwardly, from the joining with said inner walls, to said outer walls;
   (d) a resilient tab formed in each of said bottom and inner side walls by a generally U-shaped arcuate slot cut therethrough, said tabs hinging adjacent said joining whereby said tabs will allow the eggs a tendency to tilt such that their longitudinal axes point in the general direction of the respective corners formed by the outer side walls and the bottom walls;
   (e) said tabs formed in said inner side walls having sufficient size and resilience to permit appreciable tilting of said egg axes from the plane of symmetry extending through said centerline of the carton, whereby an appreciable variation in the sizes of eggs accommodated within said compartments is possible.

3. A cardboard egg carton as in claim 2, wherein said tabs formed within said bottom walls, and hinged thereto adjacent said joining of said bottom walls with said inner side walls, are resiliently pivotable inwardly as well as outwardly of said compartments, whereby said tabs in said bottom walls may be employed to facilitate removal of eggs from said compartments.

References Cited in the file of this patent

UNITED STATES PATENTS

| 1,963,379 | Petter | June 19, 1934 |
| 2,113,459 | Brundin | Apr. 5, 1938 |
| 3,034,696 | Swanson | May 15, 1962 |

FOREIGN PATENTS

| 867,444 | Great Britain | May 10, 1961 |